UNITED STATES PATENT OFFICE.

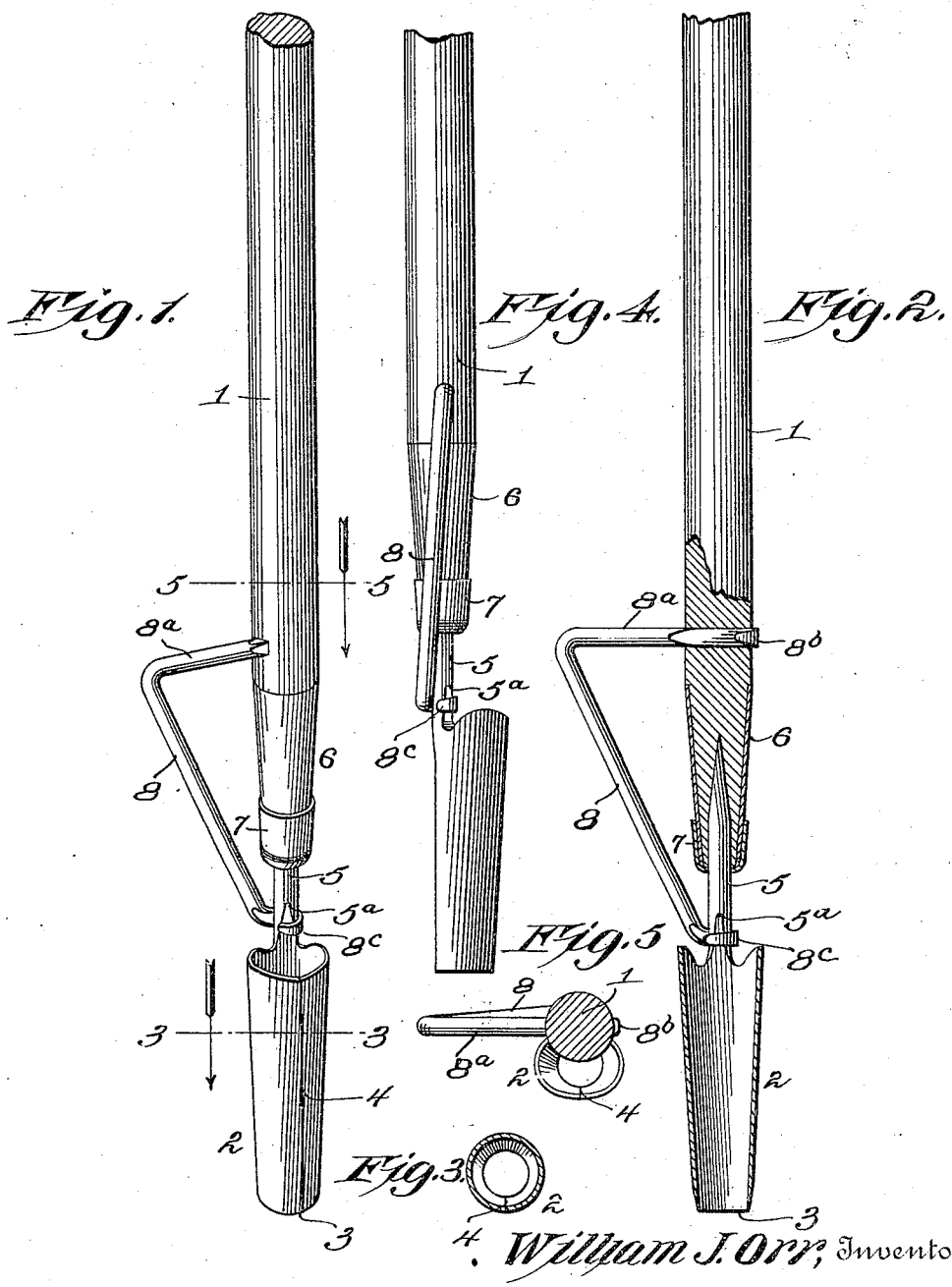

WILLIAM J. ORR, OF WESTPLAINS, MISSOURI.

AGRICULTURAL IMPLEMENT.

No. 855,902.  Specification of Letters Patent.  Patented June 4, 1907.

Application filed July 14, 1906. Serial No. 326,290.

*To all whom it may concern:*

Be it known that I, WILLIAM J. ORR, a citizen of the United States, residing at Westplains, in the county of Howell and State of Missouri, have invented a new and useful Agricultural Implement, of which the following is a specification.

This invention relates to an improvement in agricultural implements, and has for its object to provide a tool which may be used for a variety of purposes, as for instance, in transplanting strawberry and other plants, in patching bare places of lawns, and in extracting weeds.

A further object is to provide a tool of simple and inexpensive construction which can be easily and successfully operated in any grade of soil.

A still further object is to provide a tool of such construction that will obviate the necessity of the operator bending over and removing each weed therefrom as it is extracted.

The invention consists of certain features of construction hereinafter set forth and claimed.

In the drawings, in which the preferred form is shown:—Figure 1 is a perspective view of the device. Fig. 2 is a side elevation of the same showing a portion thereof in section. Fig. 3 is a cross section of the cylinder taken on line 3—3 of Fig. 1. Fig. 4 is a side view showing the angle made by the foot piece, and Fig. 5 is a cross section on the line 5—5 of Fig. 1.

Similar reference numerals designate corresponding parts in all the figures of the drawings.

Referring to the drawings, 1 designates a tool-handle of the usual type and ordinary length. Mounted on the lower end thereof, is a downwardly tapered open-ended metallic cylinder 2, the lower edge of which forms a cutting-edge 3. The cylinder is preferably made of steel, and when rounded into form, the two meeting side edges thereof produce the vertical slit 4. The cylinder is firmly held in engagement with the handle by means of the tang 5, which is integral with the cylinder and increases in diameter until it reaches the point 5$^a$, located midway between the top of the cylinder and lower end of the handle, at which place the tang assumes a cylindrical form. Mounted on the lower end of the handle is the bushing 6, which is inset so that its outer surface lies flush with the handle. On this bushing is mounted the ferrule 7, which serves to prevent the handle from splitting when the tang is forced into the handle.

An angular-shaped foot-piece 8 is attached at one end to the handle and at the other end to the tang. That portion of the foot-piece 8$^a$ that engages the handle is of a rectangular shape, and is securely held in position by being passed transversely through and having the end clenched against the handle, as shown at 8$^b$. The lower portion of the foot-piece that engages the tang is flattened and tapered to the end, as shown by 8$^c$. It engages the outer side of the tang to insure a free passage for the blocks of grass, weeds, etc., which may be extracted; and is bent around the tang midway of the tapered portion and coacts therewith to prevent both longitudinal and lateral movement of the cylinder with respect to the handle.

By referring to Figs. 4 and 5, it will be noted that the tang 5 extends up from one side of the cylinder or cutter, which causes the handle to be disposed at one side of the center of the cylinder or cutter, and this eccentric disposition of the handle with reference to the cylinder or cutter is important, as it permits a free discharge of the weeds from the top of the cylinder or cutter. The foot-piece being arranged at right angles to the cylinder or cutter, does not interfere with the described operation of the latter. In other words, the top of the cylinder or cutter is entirely unobstructed by either the handle or the foot-piece.

The practical operation of the tool will be readily understood. After placing the cylinder over the crown of a weed or plant, it is forced into the earth to a depth of from one to three inches by pressure exerted on the foot-piece. The cylinder is then withdrawn by a slight bend and pull, with the weed or plant and the surrounding soil remaining therein. On the operation being repeated, the first weed or plant is forced out the cylinder from the top, by the pressure exerted by the incoming weed or plant.

In patching bare places in lawns, etc., a few holes are made in the bare places by the tool; an equal number of grass blocks are then secured by the described process, and placed in the holes previously made.

It will be noted that the foot-piece not only performs its usual functions, but it acts as a brace for the cylinder and holds the me rigidly in place.

Having thus described my invention, what I wish to claim as new, and secure by Letters Patent, is:—

1. A tool of the class described, comprising a handle, a cutter mounted on the lower end thereof, and a foot-piece connecting the handle and cutter.

2. A tool of the class described, comprising a handle, a downwardly tapered metallic cylinder mounted on the handle, and a foot-piece connecting the handle and cylinder.

3. A tool of the class described, comprising a handle, an open-ended cylinder located at the lower end thereof, and an angular-shaped foot-piece engaging the handle and the cylinder.

4. A tool of the class described, comprising a handle, a metallic cylinder having a tang integral therewith and engaging the handle, and a foot-piece, one end of which engages the handle by being passed therethrough and clenched, and the other end thereof is secured to the tang.

5. A tool of the class described, comprising a handle, a split metallic cylinder, a tang integral with the cylinder and secured to the handle, and a foot-piece having one end thereof engaging the handle, and the other end flattened and tapered and bent around the tang.

6. A tool of the class described, comprising a handle, a cutting cylinder attached to the handle, and a foot-piece mounted on the handle, and the cylinder, so that both longitudinal and lateral movement of the cylinder with respect to the handle is prevented.

7. In a weeder, a handle, a cutter secured to the handle, and a foot-piece engaging both the cutter and the handle, the upper portion of the foot-piece passing through the handle, and the lower portion thereof engaging the tang directly over the cylinder.

8. In a tool of the class described, a handle, an open-ended cylinder arranged eccentrically to the handle and having a tang connected to the handle, and a foot-piece connected to the handle and the tang and arranged at one side of both.

9. In a device of the class described, the handle, in combination with the openended cylinder having its lower end constituting a cutting edge and a portion of its upper end terminating in a tang, said cylinder being connected to the handle by means of the tang so as to be disposed in eccentric relation thereto, and a foot-piece attached to the handle and the tang and arranged at right angles to the cylinder.

In testimony, that I claim the foregoing as my own, I have hereto affixed my signature in the presence of two witnesses.

WILLIAM J. ORR.

Witnesses:
  O. B. SAUNDERS,
  J. McB. JOHNSON.